(12) United States Patent
Landa

(10) Patent No.: US 7,127,074 B2
(45) Date of Patent: Oct. 24, 2006

(54) METHOD AND APPARATUS FOR SLEEP CONDITIONING

(76) Inventor: Adam Landa, 116 W. Lake Blvd., Mahopac, NY (US) 10541

( * ) Notice: Subject to any disclaimer, the term of this patent is extended or adjusted under 35 U.S.C. 154(b) by 392 days.

(21) Appl. No.: 10/166,720

(22) Filed: Jun. 12, 2002

(65) Prior Publication Data

US 2003/0231778 A1    Dec. 18, 2003

(51) Int. Cl.
*H04B 15/00*    (2006.01)
*H04B 3/00*    (2006.01)
*H04R 29/00*    (2006.01)
*G08B 23/00*    (2006.01)

(52) U.S. Cl. .................. 381/94.5; 381/56; 381/77; 340/573.1

(58) Field of Classification Search ............. 381/94.1, 381/94.5, 77; 340/573.1; 367/197–199
See application file for complete search history.

(56) References Cited

U.S. PATENT DOCUMENTS

| | | | | |
|---|---|---|---|---|
| 3,870,956 A | * | 3/1975 | Wolff | 455/352 |
| 5,210,532 A | * | 5/1993 | Knoedler et al. | 340/825.69 |
| 5,220,685 A | * | 6/1993 | Bradt et al. | 455/194.1 |
| 6,043,747 A | * | 3/2000 | Altenhofen | 340/573.1 |
| 6,091,329 A | * | 7/2000 | Newman | 340/539.15 |
| 6,462,664 B1 | * | 10/2002 | Cuijpers et al. | 340/573.1 |
| 6,681,020 B1 | * | 1/2004 | Papopoulos et al. | 381/122 |
| 6,751,316 B1 | * | 6/2004 | Gligoric | 379/421 |
| 6,759,961 B1 | * | 7/2004 | Fitzgerald et al. | 340/573.1 |
| 2004/0087318 A1 | * | 5/2004 | Lipovski | 455/456.4 |

OTHER PUBLICATIONS

Search Report.

* cited by examiner

*Primary Examiner*—Laura A. Grier
(74) *Attorney, Agent, or Firm*—Richard E. Kurtz; Greenberg Traurig, LLP

(57) ABSTRACT

Disclosed is a baby monitor which includes a base unit having a microphone for receiving sound and a transmitter for conveying the sound to a remote unit, and a remote unit including a receiver for receiving the sound from the transmitter and a speaker for reproducing the sound. A timed mute system is provided for muting the speaker upon engagement of an engagement device, and for automatically unmuting the speaker after a period of time has elapsed.

18 Claims, 1 Drawing Sheet

METHOD AND APPARATUS FOR SLEEP CONDITIONING

FIELD OF THE INVENTION

The present invention relates to the field of baby monitoring devices. More particularly, this invention relates to a baby monitor with capability to aid in sleep conditioning of the baby.

BACKGROUND OF THE INVENTION

Baby monitors are well known and have been around for years. Generally, a baby monitor consists of a base unit and a remote unit. The base unit contains a microphone for receiving ambient sounds near where the unit is located and a way to send those received sounds to the remote unit. The remote unit of the baby monitor generally has a way to obtain the sounds received by the microphone of the remote unit, and a speaker for playing the sounds back.

While baby monitors could use wired technology, in recent years wireless technology has proved sufficiently reliable and inexpensive so as to permit the base unit to contain a transmitter for transmitting the received sounds and the remote unit to contain a receiver to receive the sounds. These transmitters and receivers may operate at any frequency, and commonly use the well known 900 Mhz or 2.4 Ghz bands.

Generally the base unit is plugged in, and in the better models also has battery backup. Also, generally, the remote unit has a plug and in the better models a rechargeable battery to permit mobile use within the limits of the radio range.

A number of variations have recently been on the market. For example, many baby monitors have included lights to indicate the sound level and/or the radio reception. Better models of baby monitors provide a second channel so that the caretaker can select the one with better reception. At least one baby monitor now comes with two remote units permitting two caretakers to monitor them in different locations.

Often baby monitors are used in the caretaker's bedroom to listen for the baby awakening in the nursery. When this happens, the baby monitor may magnify the sounds from the nursery prohibiting the caretaker from sleeping because the baby is making short or small noises. While the caretaker can turn down the volume on the monitor, he or she must be very careful not to put the volume of the monitor too low to hear the baby cry. Inevitably, the volume is left higher than necessary to make sure that the caretaker is awakened by real crying, thus preventing the caretaker from getting sleep when the short or small noises occur. What my wife and I found is that our little Alexa, who at the writing of this document is just three months old, make all kinds of squeaks and peeps that broadcast loudly through the remote unit, often keeping us awake.

Many parents believe that babies, at a fairly young age, should be conditioned to sleep. One theory on such conditioning is by a Dr. Robert Ferber. The process of conditioning a baby to sleep following Dr. Ferber's method is referred to as "Ferberizing." My mother-in-law, on the other hand, said that she used to do something just like that, but called it "letting the baby cry it out." Regardless of the name one assigns to it, the process involves some intentional delay in attending to the baby once cry has started.

For example, Dr. Ferber recommends, depending on a number of factors including how aggressive the caretaker wants to be and how many nights the conditioning has already taken place, that, until the baby falls asleep, a first period is waited before comforting the crying baby a first time, a second, longer period is waited before comforting the crying baby a second time, and a third, even longer period is waited before comforting the crying baby the third and subsequent times. In addition to varying the duration of the first, second and third periods, it is also desirable to vary the duration of all three periods on successive nights. Dr. Ferber, proposes that the first, second and third periods are each longer on the second night, and even longer on the third and subsequent nights. Eventually, according to Dr. Ferber, the baby will learn to stop crying and sleep better quite quickly—often in just a few days.

But these few days are a tough few days for the caregiver. What my wife and I found extremely difficult with our first child, Jonathan, was waiting for the interval to elapse while listening to his crying go un-consoled. In practice, each time my wife and I conditioned the sleep of my first child, Jonathan, we found ourselves going back into our room where we kept the baby monitor to listen to him and watch the clock. Although conditioning Jonathan's sleep took only 3 or 4 days, unfortunately, we found ourselves having to do it more than once as a result of breaking Jonathan's sleep conditioning. And it is all too easy to break the sleep conditioning. For example, when Jonathan would get sick, my wife and I would spend the night consoling him. When Jonathan got better, his sleep conditioning no longer existed, and he needed to be reconditioned.

What is needed is a monitor that can assist in resolving these problems and difficulties, and that can potentially lead to better sleep for the caretakers.

SUMMARY OF THE INVENTION

In accordance with a preferred embodiment, the invention provides a baby monitor which includes a base unit having a microphone for receiving sound and a transmitter for conveying the sound to a remote unit, and a remote unit including a receiver for receiving the sound from the transmitter and a speaker for reproducing the sound. A timed mute system is provided for muting the speaker upon engagement of an engagement device, and for automatically unmuting the speaker after a period of time has elapsed.

DESCRIPTION OF THE PREFERRED EMBODIMENTS

Figure 1:
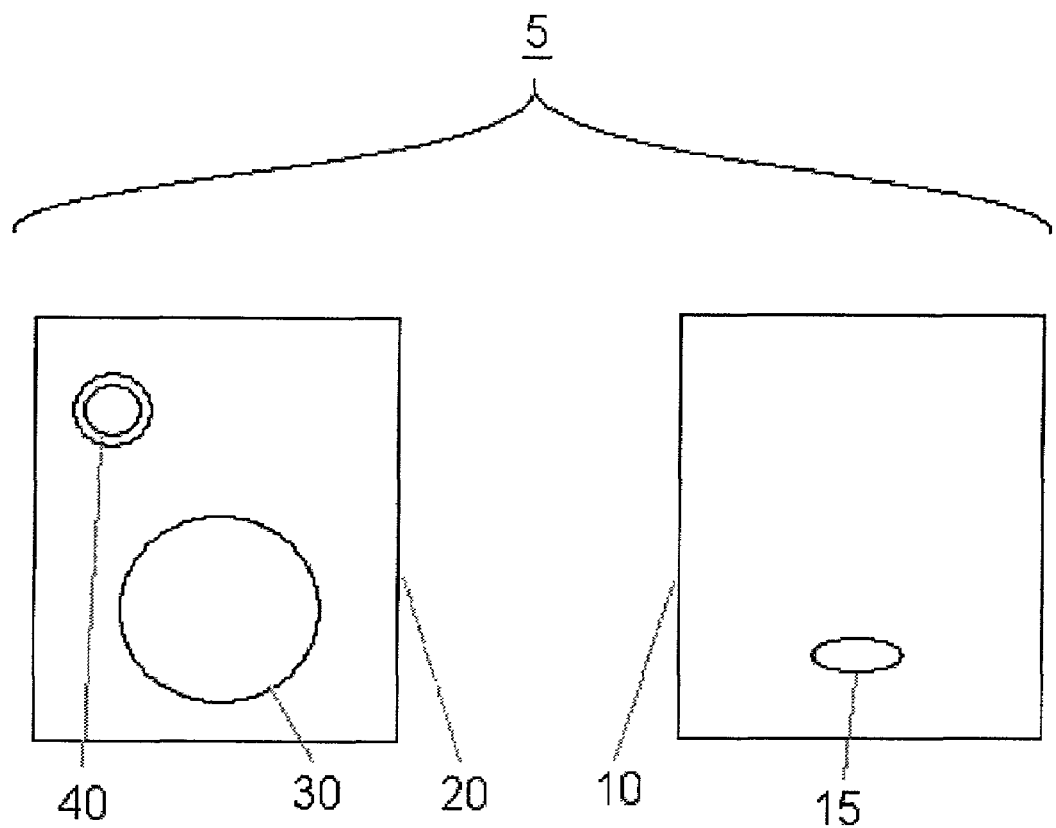
FIG. 1 is a schematic front view illustrating the invention in accordance with one preferred embodiment.

In the following description of the preferred embodiments, reference is made to the accompanying drawing which forms a part of this description, and in which are shown by way of illustration, specific embodiments in which the invention may be practiced. The reader should understand that other embodiments may be used and that structural changes may be made without departing from the scope of my invention.

Turning first to FIG. 1, a baby monitor 5 is shown comprising base unit 10 and remote unit 20. In this embodiment, base unit 10 contains a microphone 15 for receiving sounds and a transmitter (not shown) for transmitting the sounds to a receiver of the remote unit 20. Remote unit 20 contains a receiver (also not shown) corresponding to the transmitter of the base unit 10. The transmitter of the base unit 10 and the receiver of the remote unit 20 may be linked via a wired connection but are preferably wireless. Where a radio frequency is used, the 900 Mhz and 2.4 Ghz transmitters and receivers are well known and relatively inexpensive. It is not necessary that the transmitter and receiver transfer analog data; other radio frequency technology such as Bluetooth, 802.11 or any wireless technology, could also be used to implement the invention.

Additionally, remote unit 20 contains a speaker 30 and timed mute button 40. The timed mute button 40, may be any type of control, but preferably is a single pole contact switch that activates a timer. When the timed mute button 40 is pushed (or otherwise activated), it causes the remote unit to mute the output of speaker 30 until the timer expires. The mute may prevent any sound from coming out of the speaker 30, or preferably can attenuate the sound. For example, causing the remote unit 20 to mute the sound could attenuate the sound output by the remote unit 20 by 12 db, or more if desired.

It is important to note that in order to prevent sound from coming out of the speaker 30, mute need not affect the speaker 30, but rather could affect the microphone 15 or any other component that can affect the volume of the output at the speaker 30.

When the timer expires, the speaker 30 is again unmuted, and normal operation resumes. For convenience, unless the context dictates differently, the period while the speaker 30 is muted will be referred to as the muted period, and the period while the speaker is not muted will be referred to as normal operation or the unmuted period.

For the purpose of description, the state of the baby monitor 5 during any muted period may be referred to as being in a muted state.

Many variations are possible on the general idea of a baby monitor 5 including a timed mute feature. A number of different variations and features to the baby monitor 5 are disclosed below. Such variations and features, and others that will be apparent to a person of skill in the art, may be mixed and matched with each other as well as with known baby monitor features (e.g., lights, volume controls, multiple channels, multiple receivers, etc.) in creating a baby monitor 5 with a desired feature set. All of these and variations that will be apparent to one of skill in the art fall within the scope of the present invention.

The timed mute button 40 is shown on the remote unit 20 in the exemplary embodiment, however, there is no requirement that the timed mute button 40 be physically located there. In fact, it may be preferable to locate the timed mute button 40 on the base unit, as the muting can then take place when the caretaker is present in, e.g., the nursery. Such an embodiment has a few advantages. First, it permits more accurate timing of the muted period because the period may begin as the caretaker leaves the nursery rather than when the caretaker reenters the room in which he or she will await the delay. Second, it prevents a caretaker from pressing the timed mute button 40 (which could be located near the caretaker's bed) as if it were a snooze on an alarm (or doing so unintentionally in a sleep state) to allow further sleep.

In another embodiment, the baby monitor 5 would include a timed mute button 40 that can be located separately from the base unit 10 or the remote unit 20. In such an embodiment, it would preferably be connected to the system by an infrared or radio frequency remote control that can be located in a convenient place.

In yet another embodiment, the timed mute button 40 could take the form of a motion detector, body heat detector or even voice detector in the nursery. In such an embodiment, the detector could engage after detecting the presence of a caregiver, and then the absence of the caregiver. Such an embodiment would provide substantially automatic control with little chance of unintentional or even intentional misuse.

In one embodiment, a baby monitor 5 would include a control that permits selection of the amount of attenuation that occurs to the speaker 40 during the muted period. Such a control may be selectable between greater and lesser degrees of muting or between complete and partial muting. Such a control may for example, have discrete settings, or may be continuously variable.

In a baby monitor 5 that includes a volume control that controls the output level of the speaker 30, such an optional control could, for example, operate as a volume control subordinate to the existing (i.e., master) volume control. In other words, the master volume control may control the volume of the system during normal operation, whereas the subordinate volume control could attenuate the volume from the master volume during the muted period.

The transition from the muted period to the unmuted period need not be instantaneous. It may be desirable to permit the unmuted period to resume slowly so that the caretaker is not suddenly shocked or awakened by an amplified cry of the baby. The period during which such a transition takes place would preferably be in the range of 0 to about 30 seconds, but could be more depending on the preference of the manufacturer or the caretaker.

The baby monitor 5 could have a preprogrammed period of transition or could comprise a control that would permit the caretaker to adjust the period of the transition from a muted to unmuted period through a wide variety of lengths. In a preferred embodiment such a control would permit selection of the length of transition from about 1 to about 30 seconds.

Yet another feature that would be highly desirable in the inventive baby monitor 5 is to provide multiple muted periods. For example, a first muted period could last for a first amount of time, while a second muted period could last for a second muted time. In such an embodiment, a first activation of the timed mute button 40 can engage the first muted period, while the second activation of the timed mute button can engage the second muted period. Any number of muted periods could be used.

In addition to having multiple muted periods, a preferred embodiment may also include having sets of muted periods that can be used at different times. Some of the uses for multiple periods can be illustrated by example. Assume that we have a baby monitor 5 having a first set of muted periods consisting of a first muted period of ten minutes and a second muted period of twenty minutes, and a second set of muted periods consisting of a first muted period of fifteen minutes and a second muted period of thirty minutes. Using this example, when the timed mute button 40 is engaged, the first mute period of ten minutes begins. The second and subsequent depressions of the timed mute button 40 would cause the second mute period of 20 minutes to begin. Between the muted periods, the caretaker has gone to comfort the baby. In a preferred embodiment, when a relatively long period of time elapses between the uses of the timed mute button 40, the baby monitor could either: (i) automatically return to its initial state, and use the first mute period of ten minutes when the button 40 is next depressed; or (ii) automatically change to a different state that would permit the second set of muted periods to be used subsequently. The amount of time that would qualify as such a relatively long period of time could be a half hour or a day or more, and could be user controllable.

For the purpose of description, the state of the baby monitor 5 when the next engagement of the timed mute button 40 will cause the initiation of the first muted period of the first set may be referred to as being in an initial state. Where the next engagement of the timed mute button 40 will cause the initiation of a muted period other than the first muted period of the first set, the baby monitor 5 may be referred to as being in a subsequent state.

In a preferred embodiment, the inventive baby monitor 5 could be programmed to have any number of sets of any number of muted periods. It would be desirable to permit the caretaker to easily select a preprogrammed configuration having three sets of three muted periods. In each such set of muted periods, each of the three muted periods would have a different length, the second being longer than the first, and the third being longer than the second. As between each of the three sets, the each of the muted periods is the same or longer in higher numbered sets. In such a preferred embodiment, preferably the first set would be used on an initial night, the second set on the subsequent night, and the third set on the third night, and thereafter. Until the system is reset. While in a preferred embodiment each of the muted periods could be controlled by a caretaker, it would also be preferable to have preset periods for ease of use.

In a preferred embodiment, the baby monitor 5 would include a timed mute button 40 on the remote unit 20 that would operate in the initial state, and a second timed mute button (not shown) on the base unit 10 that would operate in the subsequent states. In this manner, when the baby first cries, the timed mute button 40 on the remote unit 20 can be engaged, permitting the caregiver to enjoy the first muted period without leaving the location of the remote unit 20. When the first mute period ends, assuming that the baby is still crying, the button 40 no longer functions, and only the timed mute button (not shown) on the base unit 10 will operate. A number of events can be used as a trigger the re-enabling of the timed mute button 40 on the remote unit—such as, for example, a reset, or, the expiration of a given period, or, as will be discussed in more detail below, a determination that the baby is no longer crying.

In one embodiment, the inventive baby monitor 5 is preprogrammed in accordance with the times recommended by Dr. Richard Ferber or another sleep professional so that carrying out the sleep professional's recommended method could be done, in large part, without listening to the baby cry more than necessary or desired.

It is common in many households, even today, that the VCR flashes 12:00. To make the programmable baby monitor 5 easier to use or program, in a preferred embodiment, a baby monitor 5 would permit configuration by selection of groupings of preprogrammed muted periods. For example, one grouping could include three sets of three muted periods corresponding to a manufacturer's recommended use, while a second grouping could include four sets of two muted periods corresponding to a manufacturer's different recommended use. Such configurations would preferably be easily selected by the caretaker, such as, by using a single control. Such a control could, for example, be a rotary switch with three set positions, one for caretaker programmed, one for a first recommended setting and one for a second recommended setting.

To prevent skipping of states, the timed mute button 40 is preferably deactivated during a muted state. In other words, depressing the timed mute button 40 during the muted period will have no effect. This prevents, for example, a sleepy caretaker from accidentally extending the length of a muted state by initiating a muted period while a muted state exists.

As another feature to prevent accidental improper use, especially from a sleepy caretaker, the baby monitor 5 would further disable use of the timed mute button 40 for some period after any muted period ended. For example, the button 40 may be disable for one minute. Since, when using the inventive baby monitor in the preferred manner, the caretaker is supposed to comfort the baby between muted states, the short period (such as one or two minutes) of disabling the button 40 is likely to reduce accidental re-engagement of the muted state.

Such a feature can also be used to, in effect, enforce a minimum comfort time for the baby. For example, where a caretaker might choose to sleep rather than spend a minimum desirable time comforting the baby, the disabling of the button 40 may reduce the desire of the caretaker to return to bed. This results from the caretaker's inability to mute the baby monitor 5 if he or she returns to the bedroom before a minimum time has elapsed.

It is also desirable to disable the button 40 during periods where the baby is not crying. A monitoring circuit can be used to determine whether the baby is crying, filtering out short squeaks or other baby sounds.

Another variation that can be programmed in a preferred baby monitor 5 is a variable mute. In other words, the first muted period could be muted at complete silence, while the second muted period could be muted at 24 db. In a preferred baby monitor 5 the amount of mute would be selectable for each muted period in each set.

A preferred baby monitor 5 would include a reset that would cause the baby monitor 5 to return to its initial state. The reset preferably includes a control accessible to the caretaker. Additionally, the reset would preferable also include an automatic reset after a period. The period for the automatic reset may be programmed by the manufacturer, and, is preferably a value that can be controlled by the caretaker.

As the preferred baby monitor 5 of the present invention may consist of a large number of optional periods and other controls, it is desirable to create a useful interface on a computer such as a personal computer like a Macintosh or Windows-based computer. Using a computer a fairly simple user interface could be designed. The computer could provide a programming platform, and then, upon command, upload the programming information to the baby monitor. This can be done with almost any kind of link between the computer and the baby monitor, which could be wired or wireless.

In one preferred embodiment, a wireless link can share the same means of communicating with the baby monitor as that used by the transmitter and the receiver. In one embodiment, peripheral device could be attached to the computer via a convenient port such as USB or Firewire (IEEE 1394). The peripheral device would comprise a transmitter (and preferably a receiver) for communication (and preferably bi-directional communication) with the baby monitor 5. In another embodiment, a wireless interface card could be placed in the computer to communicate with the receiver of the baby monitor 5. In yet another embodiment, a wireless link may be established from a wireless router that treats the baby monitor 5 as a node in a network, and a computer connected to the network can address the baby monitor 5 as part of the network. In any event, the communication with the baby monitor 5 would permit the upload of a desired control value, and would preferably provide for the upload of complete configuration information. In a preferred embodiment, the connection between the baby monitor 5 and the computer would be bi-directional, and would permit the baby monitor 5 to provide its status and configuration to the computer.

Any computer capable of communicating with the baby monitor 5 can be programmed to act as a remote unit 20. Where a properly programmed computer comprises a microphone, it could act as a base unit 10. In other words, if a computer were present in the nursery, the computer itself, properly programmed, could operate as the base unit 10. Similarly, a properly programmed computer present in a listening area such as a bedroom, living area or kitchen could act as the remote unit 20. In such a configuration, the base unit 10 and the remote unit 20 could communicate using any computer network. In one embodiment, the base unit 10 and the remote unit 20 are nodes on a common network (which could be wireless or wired), and each computer connected to the network is able to act as a remote unit 20.

It is well known to use more than one remote unit 20 in connection with a base unit 10, however, according to the inventive baby monitor 5, multiple base units 10 can be implemented. In a preferred embodiment, each base unit 10 can be heard on each remote unit 20. Although most caregivers can distinguish the sounds between two babies, in one embodiment, a LED or other indicator can distinguish between the sources of sound heard on the remote unit 20.

As discussed above, one of the annoyances of a conventional baby monitor is the reproduction of noises from the nursery that are not required for care of the baby. For example, my daughter Alexa is uncommonly noisy when she sleeps, and makes many short squeaks and sighs and other baby sounds that are clearly distinguishable from crying. This is especially exacerbated where my Alexa's and Jonathan's nurseries (or any two or more nurseries) are being monitored simultaneously.

The inventive baby monitor 5 comprises a small sound filter that mutes the speaker 30 when the monitor 5 is in an excited state. As discussed above, mute may prevent any sound from coming out of the speaker 30, or preferably can attenuate the sound.

The baby's crying or other sounds of distress should trigger transition from an unexcited state to the excited state. A very simple manner of determining whether the baby is crying would involve measuring the average volume over a period of two seconds or so. Small squeaks or other noises will generally not last any significant period, and will not cause the transition between states. Crying, on the other hand (at least with my kids) causes long, relatively sustained periods of relatively loud volume noises. In varying embodiments of the invention, the small sound filter could filter different sounds, preferably, the caretaker should be able to set threshold sensitivity (such as, amplitude and/or durations), below which sounds should be filtered. To reduce the chance of accidental under-sensitivity, it is preferable to prevent caretaker control beyond preset limits. Moreover, in a preferred embodiment, the baby monitor 5 should self-level, based upon the ambient noise in the nursery. This can be done easily by averaging sound amplitude over a fairly long duration, such as 5 or 10 or 20 minutes, and using the data collected to automatically adjust the sensitivity.

Many techniques for determining amplitude and types of sound are well know, and are equally applicable for the purpose of filtering out non-crying and non-distressed sounds.

Preferably, when the baby monitor 5 is powered-up, it is in the excited state. After some period of time, such as 1 or 2 minutes without excitation of the small sound filter, the baby monitor 5 should automatically enter the unexcited state and will therefore mute the output of speaker 30. When the small sound filter is thereafter excited above its threshold, the baby monitor 5 is placed in the excited state, and the small sound filter's muting of the output of speaker 30 is removed. Note that this will not necessarily unmute the speaker 30, which may still remain muted for other reasons, as discussed herein.

As with the commands controlling other features, the length of time without excitation to enter the unexcited state, the sensitivity of the filter and the type of muting achieved (e.g., complete vs. attenuated), are all preferably provided with caretaker control.

Another feature for which the small sound filter would be very useful is to cause the baby monitor 5 to return to its initial state. In other words, to revert to the beginning of the night's cycle where the shortest period would follow engagement of the timed mute button 40. As mentioned above, the use of the small sound filter can be used to re-enable a timed mute button 40 on the remote unit 20 that only operates in the initial state.

I claim:

1. A baby monitor comprising:
   a baby monitor base unit including a microphone for receiving sound, and a transmitter for conveying the sound to a remote unit;
   a remote unit including a receiver for receiving the sound from the transmitter and a speaker for reproducing the sound; and
   a timed mute system including an engaging device, the timed mute system adapted to mute the reproduction of the sound upon engagement of the engaging device, and to unmute the reproduction of the sound, without operator intervention, after the elapsing of a predetermined period of time beginning upon engagement of the engaging device.

2. The baby monitor claimed in claim 1, wherein the engaging device is located on the base unit.

3. The baby monitor claimed in claim 1, wherein the engaging device is located on the remote unit.

4. The baby monitor claimed in claim 1, wherein the engaging device is separate from the base unit and the remote unit, but wirelessly connected to the timed mute system.

5. The baby monitor claimed in claim 1 wherein the timed mute system is adapted to mute the reproduction of sound by more than 3 decibels.

6. The baby monitor claimed in claim 1 wherein the timed mute system is adapted to mute the reproduction of sound to an inaudible level.

7. The baby monitor claimed in claim 1, wherein the timed mute system is adapted to mute the reproduction of sound for a first period upon a first engagement of the engagement device, and adapted to mute the reproduction of sound for a second period upon a second engagement of the engagement device.

8. The baby monitor claimed in claim 7, further comprising a configuration system adapted to permit the configuration of the first period and the second period.

9. A baby monitor comprising:
   a baby monitor base unit including a microphone for receiving sound;
   a speaker for reproducing sound in response to the receipt of a sound by the microphone; and a mute for temporarily muting sounds reproduced by the speaker, wherein the mute is automatically engaged by a detector detecting the presence of a caregiver in the proximity of the baby followed by the absence of the caregiver in the proximity of the baby.

10. The baby monitor claimed in claim 9, wherein the mute is automatically engaged for a period of time between 5 and 20 minutes.

11. A method for a caretaker to condition the sleep of a baby comprising the steps of:
   a. providing a baby monitor base for monitoring sounds of a baby;
   b. providing a baby monitor remote adapted to reproduce sounds of the baby;
   c. listening to the reproduced sounds for crying, and when crying is heard, soothing the baby; and
   d. engaging a mute that mutes the reproduction of sound by the baby monitor for a predetermined period of time and releases the mute without operator intervention when the predetermined period of time has elapsed since the engaging occurred.

12. The method claimed in claim 11, wherein the step of listening further comprises the steps of:
   a. going to the proximity of the baby prior to soothing the baby; and
   b. leaving the proximity of the baby after soothing the baby.

13. The method claimed in claim 11, wherein the baby monitor base is additionally for replaying sounds generated at a remote microphone, the method further comprising the step of providing a remote microphone, and the step of listening is performed by using the remote microphone to sooth the baby.

14. The method claimed in claim 13, wherein the remote microphone may be engaged and disengaged by an engagement device, and wherein the step of listening is performed by engaging the engagement device to use the remote microphone, and disengaging the engagement device when the soothing is complete.

15. The method claimed in claim 14, wherein the disengaging of the engagement device engages the mute.

16. A baby monitor comprising:
   a baby monitor base unit including a microphone for receiving sound;
   a speaker for reproducing sound in response to the receipt of a sound by the microphone;
   a mute for temporarily muting sounds reproduced by the speaker;
   a mute engagement device for causing the mute to mute sounds;
   a mute release for releasing the mute without operator intervention;
   a timer, the timer being set for a period of time by the mute engagement device, wherein the timer causes activation of the mute release upon the elapsing of the period of time, without operator intervention.

17. The baby monitor claimed in claim 16, wherein the period of time for which the timer is set by the mute engagement device is a first length of time for one setting, and another length of time for a different setting.

18. A baby monitor comprising:
   a baby monitor base unit including a microphone for receiving sound, and a transmitter for conveying the sound to a remote unit;
   a remote unit including a receiver for receiving the sound from the transmitter and a speaker for reproducing the sound; and
   a timed mute system including an engaging device, the timed mute system adapted to mute the reproduction of the sound upon engagement of the engaging device, and to unmute the reproduction of the sound, without operator intervention, after the elapsing of a period of time, wherein the engaging device is located in a location selected from the set of: (i) on the base unit; or (ii) separate from the base unit and the remote unit, but wirelessly connected to the timed mute system.

* * * * *